William J. Nichols,
Carburetter for Air and Gas.
N° 92,635.        Patented July 13, 1869.
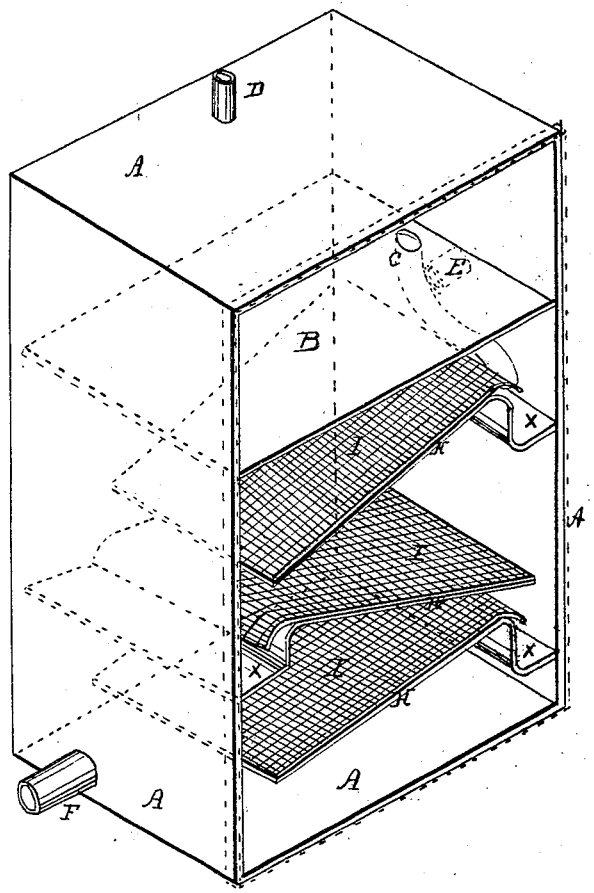
Witnesses.
Harry King.
Caleb Earle.
Inventor
Wm. J. Nichols
Alexander & Mason
his Attorneys

United States Patent Office.

WILLIAM J. NICHOLS, OF BUFFALO, NEW YORK.

Letters Patent No. 92,635, dated July 13, 1869.

IMPROVED CARBURETTER FOR AIR AND GAS.

The Schedule referred to in these Letters Patent and making part of the same.

*To all whom it may concern:*

Be it known that I, WILLIAM J. NICHOLS, of Buffalo, in the county of Erie, and in the State of New York, have invented certain new and useful Improvements in Carburetter for Air; and do hereby declare that the following is a full, clear, and exact description thereof, reference being had to the accompanying drawings, and the letters of reference marked thereon.

In the annexed drawings, making a part of this specification—

A represents a box or vessel with its lid removed, made of any suitable material and dimensions.

The box A is provided with a partition, B, thereby forming in one end thereof a reservoir or tank, in which to place the carbon or material with which to supply the carburetter.

Leading into the tank or reservoir in the end of the box A, is a supply-pipe, D, and leading from said tank is a discharge-pipe, C, which leads into and supplies the chambers or reservoirs $x$ between the angular partitions H H.

E represents a pipe leading into one end of the carburetter, near its supply-pipe C, through which the air is forced into and through the carbon or material in the chambers or reservoirs composing the carburetter.

F represents the discharge-pipe for the carbonized air or gas.

H H represent plates or partitions placed across the box A, a passage being left around opposite ends of each, so that the air will pass around and over the surface of the sides thereof, and thereby become more completely and perfectly impregnated or permeated with the carbon in the carburetter.

I I represent pieces of cloth, or porous substances, secured to the sides of the plates H H, for the purpose of absorbing or attracting the carbon from the bottom of the chambers between said plates H H, and conducting the same, from one to another, from the place where the carbon is first introduced from the tank to the other end of the series of chambers.

The action of the carbon-chamber is wholly under the influence of atmospheric pressure, the pipe C acting as a discharge of the said chamber or reservoir when the carbon is sufficiently absorbed from the chambers of the carburetter, to admit of the air forcing its way through the pipe $c$ into the reservoir or supply-chamber, when a sufficient supply of carbon is admitted from said reservoir to fill the chambers high enough to immerse the end of the pipe C in the liquid, which acts as a liquid seal.

It will thus be seen that carbon is supplied only in quantities sufficient for use, or that may be required or taken up by the air forced through the carburetter, and that the same is furnished at all times as required, so as to insure a uniform, steady, and brilliant light until the reservoir shall be exhausted.

The plates H H may be so arranged that they may be raised, so as to disconnect the porous plates or strips I I, if found at any time to be desirable.

Having thus fully described my invention,

What I claim as new, and desire to secure by Letters Patent, is—

1. The arrangement, within the case A, of a series of incline plates, H, which are covered with cloth, or other suitable material, said plates open at one end, and provided with receptacles $x$ at the opposite ends, substantially as shown and described.

2. Passing the liquid through the reservoir in a pipe, the lower end of which is open, and which extends down near the receptacles in the upper inclined plate, so as to form a liquid seal, and an automatic feed of the liquid over the plate, substantially as herein set forth.

In testimony that I claim the foregoing, I have hereunto set my hand, this 1st day of June, 1867.

WILLIAM J. NICHOLS.

Witnesses:
J. M. MASON,
V. D. STOCKBRIDGE.